United States Patent
Zaguskin et al.

[11] Patent Number: 6,079,765
[45] Date of Patent: Jun. 27, 2000

[54] WIRE HOLDING CLIP FOR TRIM PANEL

[75] Inventors: Alex Zaguskin, Farmington Hills; Patrick J. Catlin, Pleasant Ridge, both of Mich.

[73] Assignee: Lear Automotive Dearborn, Inc., Southfield, Mich.

[21] Appl. No.: 08/958,489

[22] Filed: Oct. 27, 1997

[51] Int. Cl.[7] .................................................... B60J 1/08
[52] U.S. Cl. ........................................ 296/146.1; 248/68.1
[58] Field of Search ............................. 296/146.7, 146.5, 296/146.1, 152, 146.12, 208; 49/502, 503; 174/48, 72 A, 135; 248/68.1

[56] References Cited

U.S. PATENT DOCUMENTS

| | | | |
|---|---|---|---|
| 1,772,687 | 8/1930 | Reinke | 248/68.1 |
| 2,485,891 | 3/1949 | Kindoef | 248/68.1 |
| 3,363,864 | 1/1968 | Olgreen | 248/68.1 |
| 3,491,971 | 1/1970 | Fisher | 248/65 |
| 3,861,015 | 1/1975 | Hooven | 174/72 A |
| 4,440,374 | 4/1984 | Achille | 248/544 |
| 4,807,417 | 2/1989 | Bell | 174/48 |
| 5,077,646 | 12/1991 | Parsons | 362/252 |
| 5,460,530 | 10/1995 | Toba et al. | 439/34 |
| 5,735,041 | 4/1998 | Zaguskin et al. | 29/857 |
| 5,743,497 | 4/1998 | Michael | 248/68.1 |

*Primary Examiner*—D. Glenn Dayoan
*Assistant Examiner*—Lori L. Coletta
*Attorney, Agent, or Firm*—MacMillan, Sobanski & Todd, LLC

[57] ABSTRACT

An improved apparatus and method for securing a wire harness to a vehicle trim panel includes the use of an inventive holding clip. The clip has a secured portion which is fixed to the underlying trim panel. A retaining portion is biased against the trim panel, and wires are received in a holding portion between the secured portion and the retaining portion. The clip also includes an entry portion spaced away from the retaining portion which facilitates the movement of the wire under the entry portion to bias the retaining portion away from the trim panel and allows movement of a wire into the holding portion. In a first preferred method, the wires are assembled by first attaching the clips to the trim panel and then routing the wires into the holding portion. In a second preferred method, the wires are routed into the clips prior to the clips being secured to the trim panel. The clips are then secured to the trim panel and at the same time the wires are captured on the trim panel.

18 Claims, 2 Drawing Sheets

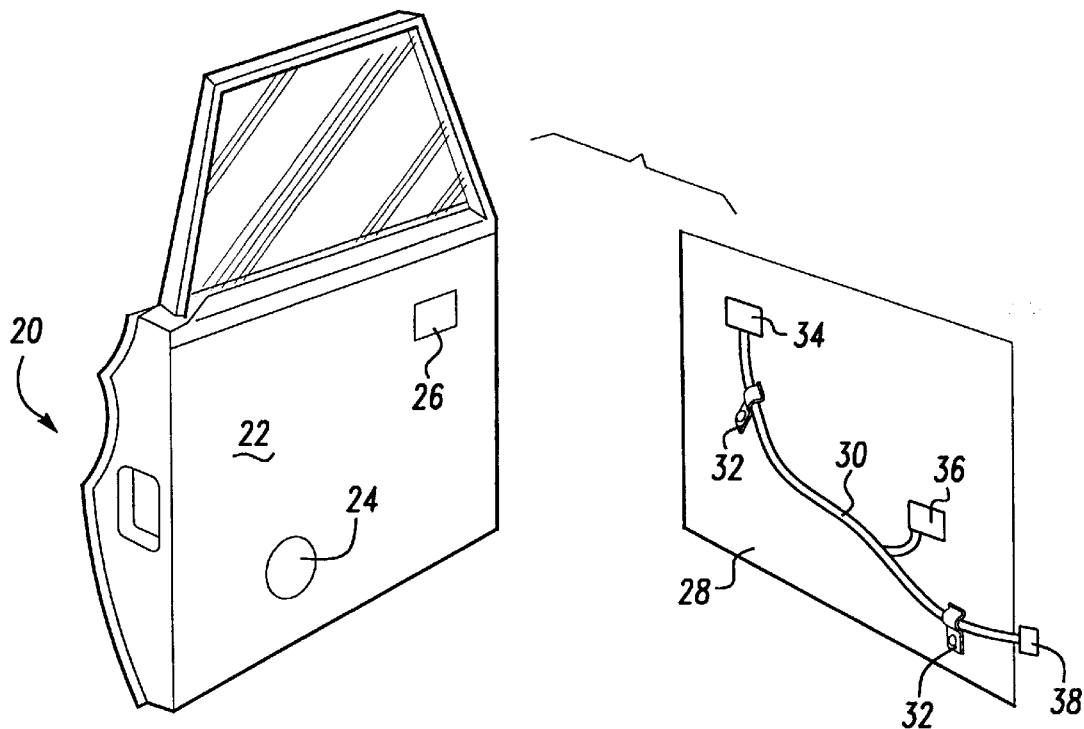
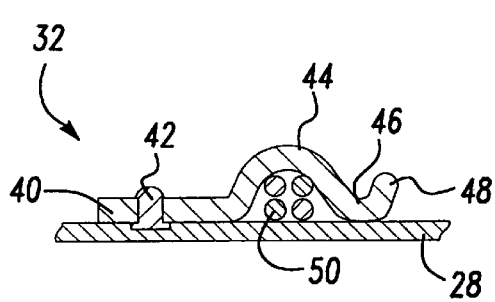
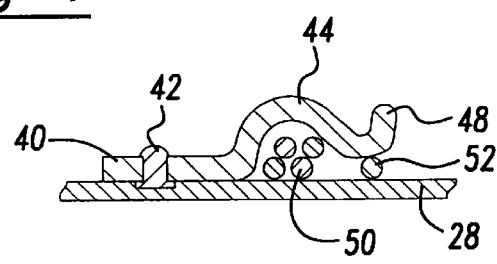
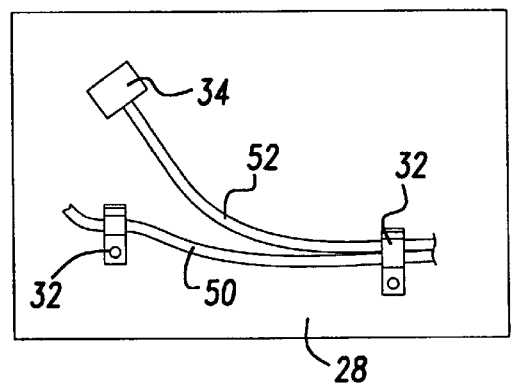

WIRE HOLDING CLIP FOR TRIM PANEL

BACKGROUND OF THE INVENTION

This invention relates to the use of a wire holding clip on a vehicle trim panel which allows the wire harness to be assembled directly onto the trim panel.

In the prior art, vehicle doors are being equipped with more and more electrical components. As an example, speakers, door locks and windows are all now typically placed in vehicle doors. Electrical communication and power must be provided to and from these components. Typically, wire harnesses are assembled at a remote location and then placed between the door frame and a trim panel which covers the door frame. This requires the assembly of the wire harness, the attachment of the wire harness to either the frame or the trim panel, and then the attachment of the trim panel to the vehicle frame.

More recently it has been proposed to assemble the wire harness directly onto the trim panel. In particular, pending U.S. patent application Ser. Nos. 08/722,376 and 08/687,133 relate to methods of forming a wire harness directly on the trim panel and then attaching the trim panel to the door frame. These methods provide valuable benefits when compared to the prior art, and simplify the assembly of the door system.

SUMMARY OF THE INVENTION

In a disclosed embodiment of this invention, an improved clip for holding wires which are assembled onto the trim panel for a vehicle is disclosed. The improved clip includes a securing portion secured to an underlying trim panel by a connection such as a weld, and an upwardly extending holding portion which overlies and secures the wires. A downwardly extending retaining portion extends from the holding portion and is biased against the trim panel to secure the wires within the holding portion. The retaining portion is not secured to the trim panel, but is instead biased against the trim panel. An entry portion extends back away from the trim panel from the retaining portion. The entry portion facilitates the snapping of wires under the retaining portion and into the holding portion. In preferred embodiments of this invention, locating tabs may be positioned on both sides of the clip to ensure the clip is properly positioned on the trim panel. The locating tabs may be associated with both sides of the securing portion, and may further be associated with at least one side of the retaining portion.

In methods of assembling the wires to the trim panel, the inventive clip may be first secured to the trim panel at desired locations. The wires may then be routed into the appropriate clips, such that the wire harness is effectively formed on the trim panel. The trim panel may then be secured to the door frame.

In an alternative method, the clips are held on assembly jigs and the wires are routed into the appropriate holding portions. Once the wire harnesses are routed, the clips are then secured to the trim panel, such as by welding. In particular, ultrasonic welding may be utilized. With this invention, the locating tabs described above become particularly valuable to ensure that the clip and the trim panel are properly positioned relative to each other when welded together.

These and other features of the present invention can be best understood from the following specification and drawings, the following of which is a brief description.

BRIEF DESCRIPTION OF THE DRAWINGS

FIG. 1 is a schematic assembly view of a door system that incorporates the present invention.

FIG. 2 is a cross-sectional view through a clip according to the present invention.

FIG. 3 shows a step in a first method of forming a wire harness with the inventive clip.

FIG. 4 shows the assembly step such as shown in FIG. 3.

DETAILED DESCRIPTION OF A PREFERRED EMBODIMENT

Figure 5:
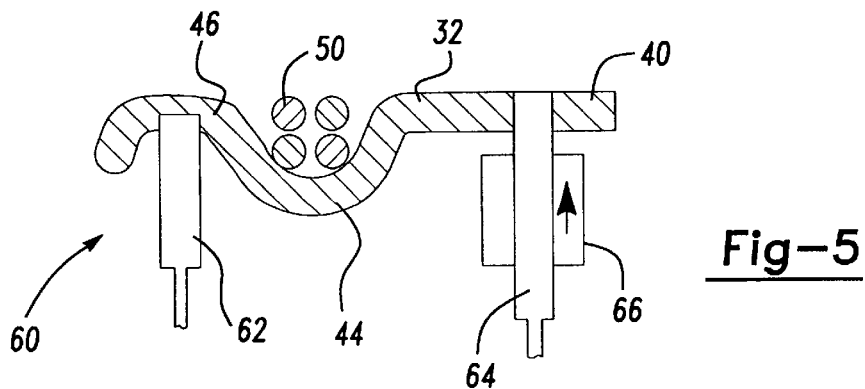
FIG. 5 shows a second method of assembling the present invention.

A door system 20 incorporates a door frame 22 which may include electrical components such as a speaker 24 or a window switch 26. It should be understood that many other electrical components are assembled in modern vehicle doors, and elements 24 and 26 are shown only by way of example.

A trim panel 28 is typically secured over frame 22 to enclose components 24 and 26. A wire harness 30 is secured under clips 32, and extends to connection portions 34 and 36 which connect to components 24 and 26. A connection 38 is then secured to a vehicle wire harness to provide electrical communication to and from the remainder of the vehicle.

A main feature of this invention is the inventive structure of clips 32 which facilitate the assembly of the wire harness 30 directly on the panel 28. As shown in FIG. 2, clip 32 has a secured portion 40 secured by a weld joint such as an ultrasonic weld 42 to the underlying trim panel 28. A holding portion 44 extends away from the trim panel from the secured portion and to a retaining portion 46 which is biased against the trim panel 28. The structure of the clip 32 is such that once portion 40 is secured to trim panel 28, portion 46 is biased against the trim panel, but not secured to the trim panel. An entry portion 48 extends away from the trim panel from retaining portion 46, and facilitates the movement of a wire such as wire 50 into the space underneath holding portion 44. As shown, several wires 50 are secured within the holding portion 44 and retaining portion 46 retains the wires at that position.

As shown in FIG. 3, a new wire 52 is being mounted into the clip 32 by pulling the wire against entry portion 48, which causes retaining portion 46 to move away from the panel 28. Wire 52 may now move beneath retaining portion 46 and into the space beneath holding portion 44.

As shown in FIG. 4, the clips 32 thus facilitate a method of assembly wherein wires are placed against the entry portion 48, and pulled into the holding portion 44. As shown, a first wire 50 has already been secured beneath the clips 32. A second wire 52 has been received underneath one clip 32, and is being routed under the leftmost clip 32. The movement such as shown in FIG. 3 will facilitate this routing.

Figure 6:
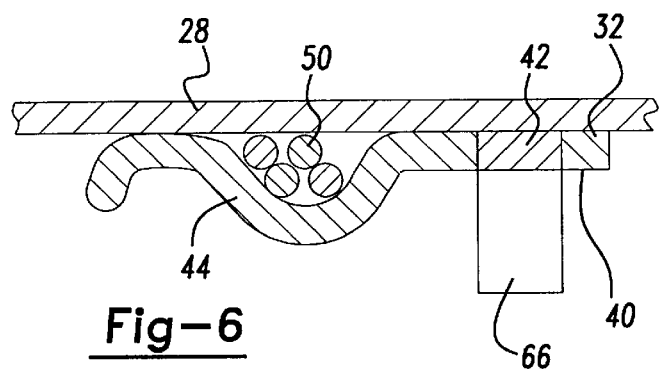
FIG. 6 shows a step subsequent to the FIG. 5 method.

FIG. 5 shows another embodiment 60 wherein jigs 62 and 64 hold the clip 32 during routing of the wire harness and wires 50. Thus, as shown in FIG. 5, the jigs 62 and 64 hold clip 32, and the wires 50 are routed into the holding portion 44. Once the entire wire harness and clip assemblies have been assembled, and as shown in FIG. 6, a weld member 66 is driven against the portion 40 to create the weld joint 42 and secure the clip 32 to the underlying trim panel 28. It should be understood that similar welding would occur at several locations and that there will be several clips on a typical trim panel 28.

Figure 7:
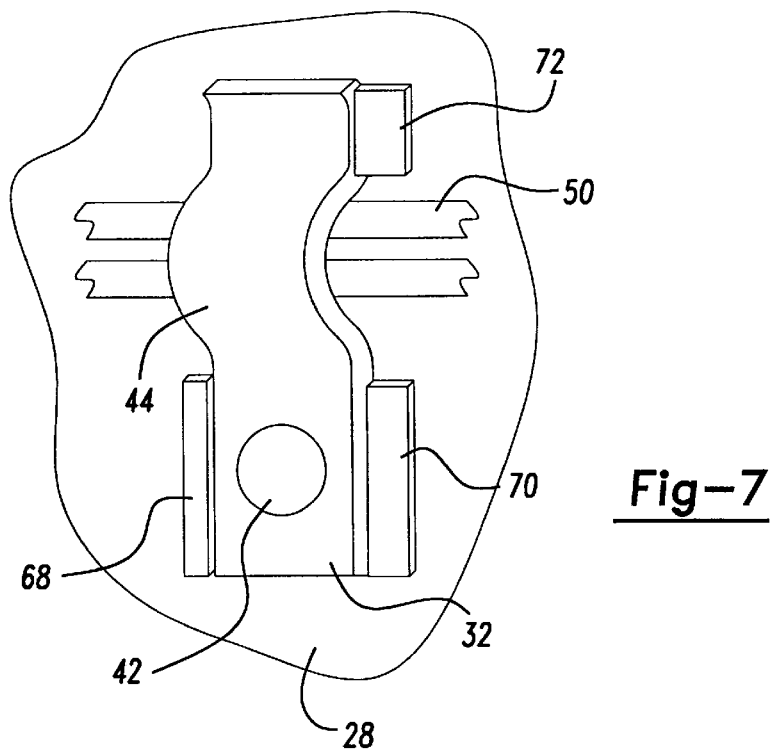
FIG. 7 shows a feature of the present invention.

As shown in FIG. 7, the trim panel 28 may be provided with locating tabs 68, 70 and 72. These ensure that the clips 32 are properly positioned on the trim panel 28 when the clips 32 are secured to the trim panel. The locating tabs 68, 70 and 72 are particularly valuable when the method of FIGS. 5 and 6 is being utilized.

Preferred embodiments of this invention have been disclosed, however, a worker of ordinary skill in the art would recognize that certain modifications would come within the scope of this invention. For that reason, the following claims should be studied to determine the true scope and content of this invention.

What is claimed is:

1. A wire holding clip comprising:

a secured portion at a first end of said clip, said secured portion adapted to be connected to a trim panel;

a retaining portion not being connected to said trim panel but biased against said trim panel;

a holding portion positioned between said secured portion and said retaining portion, said holding portion being capable of holding a wire from a wire harness;

an entry portion at a second end of said clip; and at least one locating tab positioned adjacent said clip on said trim panel to assist in positioning of said clip on said trim panel, wherein movement of the wire from said wire harness under said entry portion causes the retaining portion of said clip to bias away from the trim panel, thereby allowing movement of the wire from said wire harness into said holding portion.

2. The wire holding clip according to claim 1, wherein said holding portion extends from said secured portion and away from a surface of said trim panel.

3. The wire holding clip according to claim 2, wherein said retaining portion extends towards said trim panel from said holding portion.

4. The wire holding clip according to claim 3, wherein said entry portion extends from said retaining portion and away from a surface of said trim panel.

5. The wire holding clip according to claim 1, wherein said secured portion is connected to said trim panel by ultrasonic weld.

6. The wire holding clip according to claim 1, wherein said at least one locating tab is positioned adjacent said retaining portion of said clip.

7. A wire holding clip comprising:

a secured portion at a first end of said clip, said secured portion adapted to be connected to a trim panel;

a retaining portion not being connected to said trim panel but biased against said trim panel;

a holding portion positioned between said secured portion and said retaining portion, said holding portion being capable of holding a wire from a wire harness;

an entry portion at a second end of said clip; and a pair of locating tabs positioned adjacent said secured portion on both lateral sides of said clip.

8. A vehicle door comprising:

a door frame carrying electrical components;

a trim panel for covering a portion of said door frame;

a wire harness for communicating with said electrical components on said door frame;

a clip for holding said wire harness on said trim panel, said clip including a secured portion at a first end of said clip connected to said trim panel, a retaining portion not being connected to said trim panel but biased against said trim panel, a holding portion positioned between said secured portion and said retaining portion, said holding portion being capable of holding a wire from said wire harness, and an entry portion at a second end of said clip; and at least one locating tab positioned adjacent said clip on said trim panel to assist in positioning of said clip on said trim panel, wherein movement of the wire from said wire harness under said entry portion causes the retaining portion of said clip to bias away from the trim panel, thereby allowing movement of the wire from said wire harness into said holding portion.

9. The vehicle door according to claim 8, wherein said holding portion extends from said secured portion and away from a surface of said trim panel.

10. The vehicle door according to claim 9, wherein said retaining portion extends towards said trim panel from said holding portion.

11. The vehicle door according to claim 10, wherein said entry portion extends from said retaining portion and away from a surface of said trim panel.

12. The vehicle door according to claim 8, wherein said secured portion is connected to said trim panel by ultrasonic weld.

13. The vehicle door according to claim 8, wherein said at least one locating tab is positioned adjacent said retaining portion of said clip.

14. A vehicle door comprising:

a door frame carrying electrical components;

a trim panel for covering a portion of said door frame;

a wire harness for communicating with said electrical components on said door frame;

a clip for holding said wire harness on said trim panel, said clip including a secured portion at a first end of said clip connected to said trim panel, a retaining portion not being connected to said trim panel but biased against said trim panel, a holding portion positioned between said secured portion and said retaining portion, said holding portion being capable of holding a wire from said wire harness, and an entry portion at a second end of said clip; and a pair of locating tabs positioned adjacent said secured portion on both lateral sides of said clip, wherein movement of the wire from said wire harness under said entry portion causes the retaining portion of said clip to bias away from the trim panel, thereby allowing movement of the wire from said wire harness into said holding portion.

15. A method of assembling a wire harness onto a trim panel, comprising the steps of:

(a) providing a wire to be routed to an electrical component;

(b) providing a clip for holding said wire onto a trim panel, said clip including a secured portion at a first end of said clip connected to said trim panel, a retaining portion not being connected to said trim panel but biased against said trim panel, a holding portion positioned between said secured portion and said retaining portion, said holding portion being capable of holding a wire from said wire harness, and an entry portion at a second end of said clip;

(c) connecting said clip to said trim panel;

(d) routing said wire to be held by said clip; and (e) providing at least one locating tab onto said trim panel to assist in positioning of said clip on said trim panel.

16. The method according to claim 15, wherein said routing step is prior to said connecting step.

17. The method according to claim 15, wherein said connecting step is prior to said routing step.

18. A method of assembling a wire harness onto a trim panel, comprising the steps of:
- (a) providing a wire to be routed to an electrical component;
- (b) providing a clip for holding said wire onto a trim panel, said clip including a secured portion at a first end of said clip connected to said trim panel, a retaining portion not being connected to said trim panel but biased against said trim panel, a holding portion positioned between said secured portion and said retaining portion, said holding portion being capable of holding a wire from said wire harness, and an entry portion at a second end of said clip;
- (c) connecting said clip to said trim panel;
- (d) routing said wire to be held by said clip; and
- (e) providing at least one jig for holding said clip during said routing step.

* * * * *